United States Patent [19]

Geneix et al.

[11] Patent Number: 4,765,992

[45] Date of Patent: Aug. 23, 1988

[54] STIMULATION OF ALCOHOLIC FERMENTATION BY ADSORPTION OF TOXIC SUBSTANCES WITH CELL WALLS

[75] Inventors: Catherine Geneix, Fontainebleau; Suzanne L. Lafourcade; Pascal Ribereau-Gayon, both of Bordeaux, all of France

[73] Assignee: Universite de Bordeaux II, Bordeaux, France

[21] Appl. No.: 942,823

[22] Filed: Dec. 17, 1986

Related U.S. Application Data

[63] Continuation of Ser. No. 616,367, Jun. 1, 1984, abandoned.

[51] Int. Cl.$^4$ ............... C12G 1/00; C12G 3/00; C12P 7/06
[52] U.S. Cl. ............... 426/15; 426/11; 426/13; 435/161; 435/820
[58] Field of Search ............... 426/11, 13, 15, 16; 435/255, 256, 161, 820

[56] References Cited

U.S. PATENT DOCUMENTS 2,273,853  2/1942  Fischer ............... 426/16

FOREIGN PATENT DOCUMENTS 2359900  6/1974  Fed. Rep. of Germany .
367063   2/1932  United Kingdom .
368919   3/1932  United Kingdom .

OTHER PUBLICATIONS

Amerine et al., The Technology of Wine Making, 3rd ed. The Avi Publ. Co. Inc., Westport, Conn., 1972, pp. 309-317 & 480.

Primary Examiner—David M. Naff
Attorney, Agent, or Firm—Robert J. Koch

[57] ABSTRACT

Substances that are toxic to yeast and which cause cessation of fermentation during alcoholic fermentation are adsorbed by microorganism cell walls added to a medium being fermented. The cell walls are from a gram-positive microorganism such as yeast, and are obtained by boiling or autolysis of the microorganism followed by washing material recovered. The cell walls can be added before or during fermentation, and may be added to a previously fermented medium followed by inoculating with new yeast. The toxic substances may be certain fatty acids and their ethyl esters, pesticide residues and substances secreted by certain microorganisms. Preferably, the cell walls are added when making wine, and the medium may contain *Botrytis cinerea*.

10 Claims, 3 Drawing Sheets

STIMULATION OF ALCOHOLIC FERMENTATION BY ADSORPTION OF TOXIC SUBSTANCES WITH CELL WALLS

This application is a continuation of application Ser. No. 616,367 filed June 1, 1984, now abandoned.

BACKGROUND OF THE INVENTION

1. Field of the Invention

The present invention concerns the stimulation of the alcoholic fermentation of a substratum and applies in particular to wine production, and it is in the context of this application that the process of the invention will be described in detail. The present invention is generally applicable to all forms of alcoholic fermentation of a substratum for the purpose of producing a drink, however.

2. Description of the Prior Art

In traditional wine production it is a relatively common occurrence for fermentation to halt spontaneously before total conversion of the sugar, and this can on occasion lead to loss of the vintage.

Similarly, in the production of sparkling wines there are sometimes difficulties in bringing about the secondary fermentation which produces the bubbles.

The objective of the invention is to avoid these difficulties by proposing a means capable not only of avoiding the halting of fermentation but also, in the event of spontaneous halting, of facilitating the starting of the second fermentation.

SUMMARY OF THE INVENTION

The invention comprises a process for stimulating the alcoholic fermentation of a substratum wherein endogenous substances toxic to the yeast, in particular certain fatty acids and their ethyl esters, and possibly exogenous substances toxic to the yeast, in particular pesticide residues and substances secreted by other previously developed micro-organisms, are adsorbed by adding to the substratum yeast ghosts or yeast cell walls comprising at least one gram positive micro-organism and in particular yeast.

Generally speaking, the adsorption of said fatty acids, particularly $C_8$ and $C_{10}$ acids, and their esters makes it possible to increase the resistance of the yeast to fortified media and in consequence to avoid the halting of fermentation and, in the event of spontaneous halting of fermentation, to eliminate the major part of the inhibiting of the yeast and thus to facilitate the onset of the second fermentation.

The way in which the yeast ghosts are employed naturally varies according to the application and the types of must to be treated, as will emerge from the hereinafter detailed description of the process of the invention in its application to wine production and of various tests carried out at the time of its development, the description being given by way of example only and with reference to the accompanying drawings.

DESCRIPTION

Throughout the present description the expressions "cell walls" and "yeast ghosts" will be used interchangeably, and it is to be understood that these expressions designate what remains of the cells after boiling or autolysis followed by washing.

Figure 1:
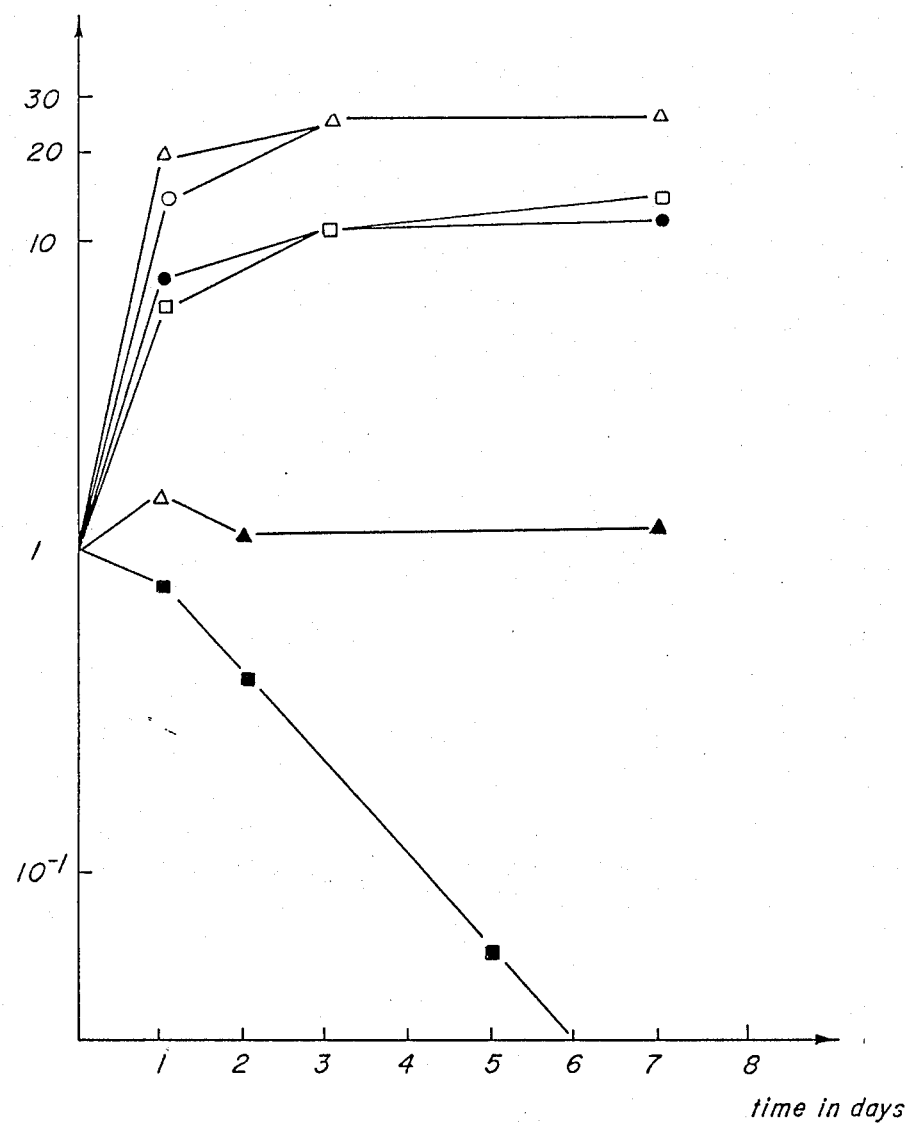
FIGS. 1 to 3 show the results of studies of the evolution in populations of "Saccharomyces cerevisiae" yeast with which various media were inoculated during the proliferation phase.
Figure 2:
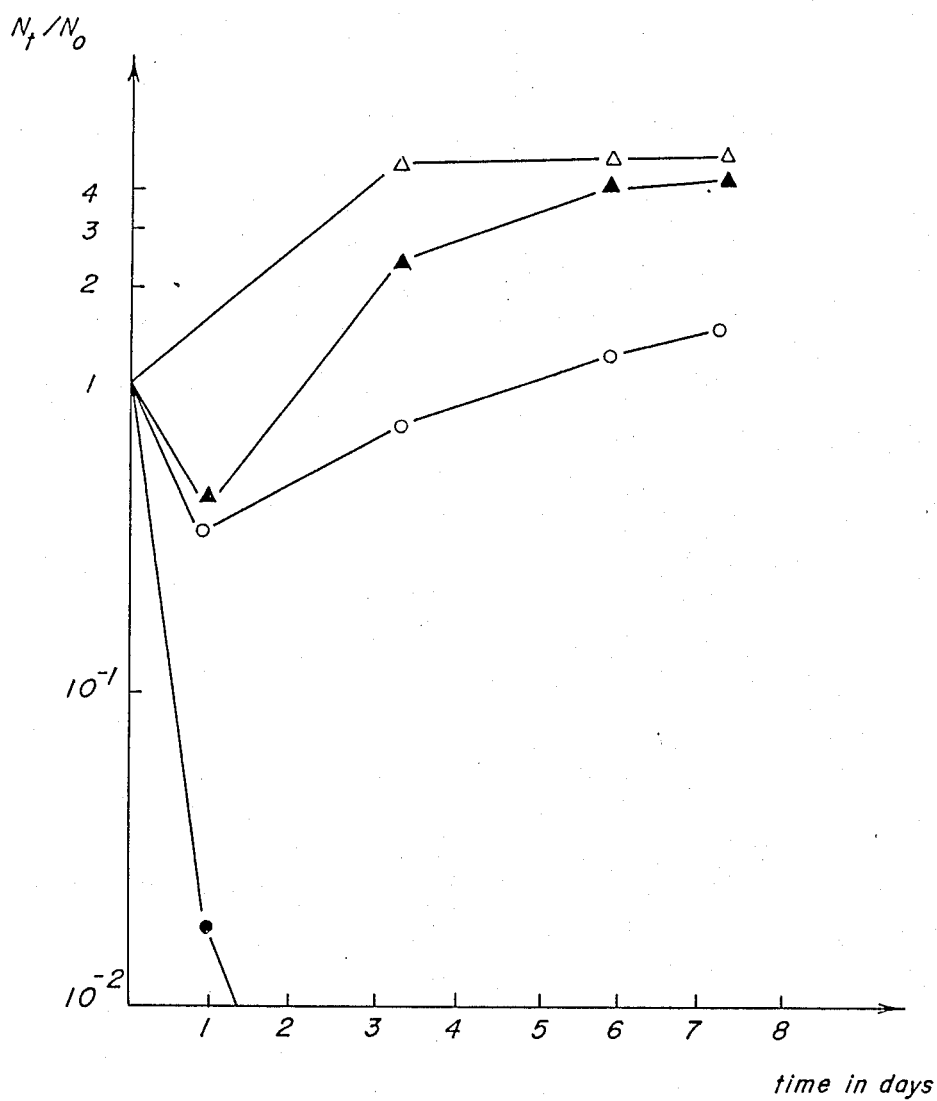
Figure 3:
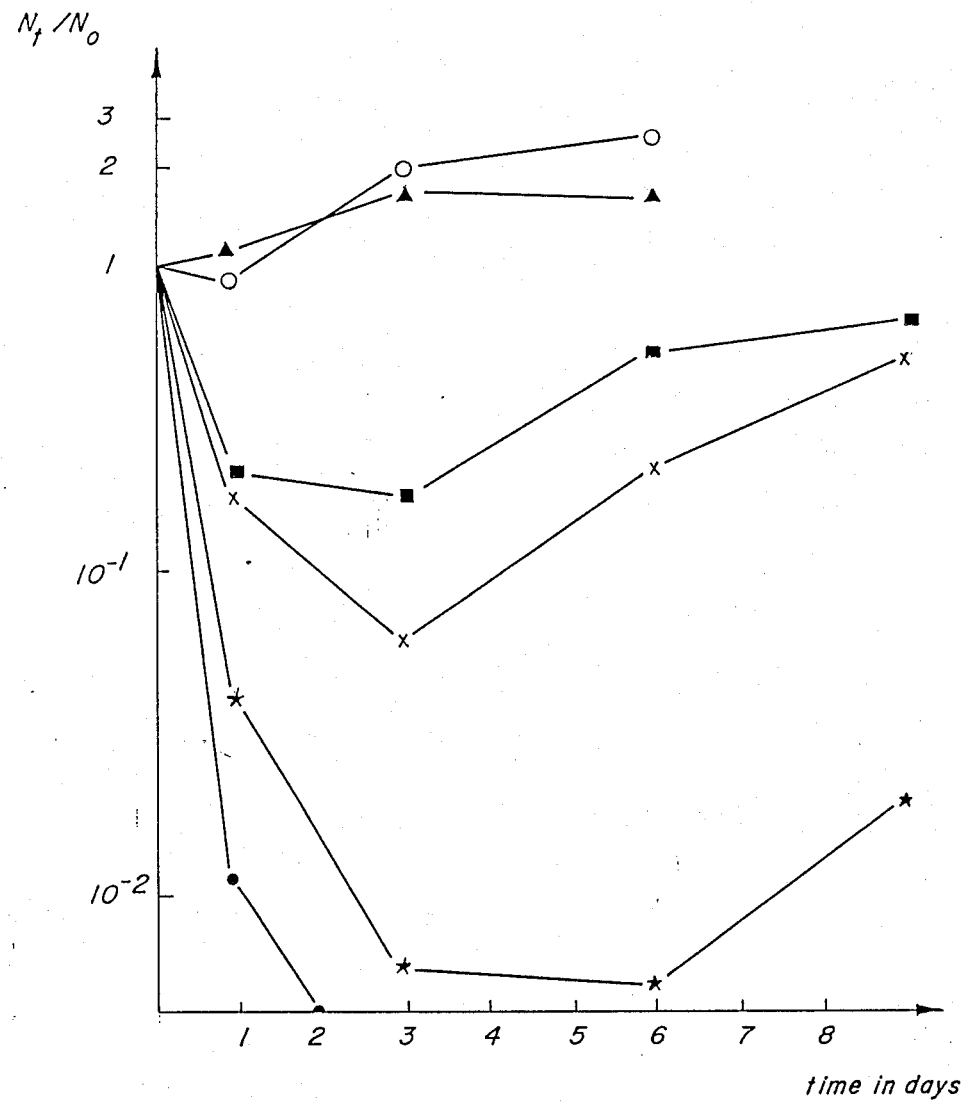

There will first be outlined with reference to FIGS. 1 to 3 the scientific principles on the basis of which said process was developed.

During the alcoholic fermentation of grape must, the growth and metabolism of yeast are progressively inhibited. This results in the spontaneous halting of fermentation before all the sugar in the medium is broken down.

Experiments have shown that this is not due to nutritional shortages (although the only treatments previously recommended tended to enrich the medium nutritionally) but to toxic substances released by the yeast itself.

FIGS. 1 to 3 of the accompanying drawings show the results of studies of the evolution of populations of "Saccharomyces cerevisiae" yeast with which various media were innoculated during the proliferation phase.

The yeast used in the experiments was a "Saccharomyces cerevisiae" stock, active dry yeast.

The initial basic medium had a pH of 3.5 and contained, per liter: 200 g of saccharose; 6 g of D-L malic acid; 3 g of tartric acid; 2 g of asparagine; 2 g of ammonium sulfate; 2 g of potassium sulfate; 0.3 g of citric acid; 0.2 g of magnesium sulfate; 0.01 g of manganese sulfate; 10 ml of vitamins in solution.

From this basic stock various media were made up by adding to the control media I, II and III (see below) a mixture of higher alcohols (per liter: 30 mg of propanol-1; 100 mg of methanol; 60 mg of methyl-2 propanol-1; 100 mg of phenyl-2 ethanol; 100 mg of methyl-3 butanol-1), fatty acids (per liter: 3 mg of $C_6$ acid; 3 mg of $C_8$ acid; 3 mg of $C_{10}$ acid) and corresponding ethanol esters (20 mg per liter) from hydro-alcoholic mother solutions. Various treatments where applied to the media:

(a) treatment with bentonite: 700 mg of bentonite are injected into the media; after one hour of contact the abundant flocculate formed is eliminated by centrifuging (10,000 revolutions/min for 5 min);

(b) treatment with carbon: 2 g of carbon are added to the media in suspension; centrifuging is carried out after one hour of contact (10 000 revolutions/min for 5 min); the material floating on the surface is recovered;

(c) heating: 250 ml flasks filled with media and hermetically sealed are heated in a large open dish of hot water for determined periods. After cooling, the alcohol content of the media was measured.

The media were sterilized by filtering through a 0.45 $\mu$m membrane into sterile flasks stoppered with a device producing semi-aerobiotic conditions.

The prefermented media I, II and III (FIG. 1) are obtained by interrupting the fermentation of the basic medium by eliminating the yeast by centrifuging twice, in the stationary proliferation phase and in the phase in which the population of "Sacch. cerevisiae" is declining.

The corresponding control media (○, △, □) are composed of the basic medium adjusted to the same sugar and ethanol contents as the prefermented media (I, II, III).

In FIG. 1, curve ○ relates to a non-fermented control medium I comprising, inter alia, 1.7% by volume of ethanol and 160 g/l of saccharose.

The curve ● relates to a prefermented medium I containing, inter alia, 1.7% by volume of ethanol and 160 g/l of hexose.

The curve Δ relates to a non-fermented control medium II containing, inter alia, 7% by volume of ethanol and 65 g/l of hexose.

The curve ▲ relates to a prefermented medium II containing, inter alia, 7% by volume of ethanol and 65 g/l of hexose.

The curve □ relates to a prefermented medium III containing, inter alia, 9.5% by volume of ethanol and 23 g/l of saccharose.

The curve ■ relates to a prefermented medium III containing, inter alia, 9.5% by volume of ethanol and 23 g/l of hexose.

Along the ordinates is plotted the ratio between the number Nt of cells per ml at time t and the number No of cells per ml at the origin, that is approximately $10^7$ in this instance.

The populations used for innoculation were precultivated in the basic medium for 24 h at 25° C. and gathered by centrifuging.

The viable populations are counted in terms of the colonies formed—in a solid nutrient medium consisting of a solution containing 20 g/l of agar-agar solution and grape must (170 g/l of sugar, pH 3.2) diluted to half-strength. The sugar is measured by an enzymatic method.

In each of the control media (○, Δ, □) an increase in the viable populations is noted, of greater or lesser extent according to the content of ethanol. In the prefermented media I and II the same phenomenon is seen, but the total growth figures are respectively twice and 25 times less pronounced than in their respective control media. On the contrary, in the prefermented medium III there is no multiplication; the population regresses from $10^7$ to $10^5$ cells per ml of seven days.

In the three control media all the sugar is broken down by the seventh day; there remains 7 to 10 g/l of sugar in the prefermented media. These results clearly show that, of the products formed by the yeast, the ethanol is not the only inhibiting factor.

Given the experimental conditions, nutritional shortages are not responsible for the inhibition phenomena.

No effect is produced if there are added to the prefermented media II and III 10 ml of a vitamin B solution containing, per liter: 4 μg of biotine; 500 mg of mesoinositol; and 100 mg of thiamine, pyridoxine, nicotinic acid, pantothenic acid and paraaminobenzoic acid.

Likewise, there is no effect on adding to said media a mixture of activators (per liter: 1 g of ammonium sulfate; 0.1 g of magnesium sulfate; 0.01 g of manganese sulfate).

Consequently, it may be thought that the inhibiting phenomena are induced by the formation during fermentation of substances toxic to the yeast.

In another series of tests it was attempted to destroy these substances by heating at 65° C. for 15 minutes; this treatment remains without effect. Thus the substances concerned are not of a protein nature. Fixing on bentonite and carbon were also tried. The former treatment is ineffective. On the other hand, the second as applied to the prefermented medium III (FIG. 2) authorizes a total growth of $6.7 \times 10^6$ cells per ml; 25 g of sugar are fermented in 6 and 8 days respectively in the control medium III and the prefermented medium III treated with carbon; 20 days are required to achieve the same result in the non-treated prefermented medium III.

FIG. 2 shows:

at ● the growth curve for a prefermented medium III with 10.5% by volume of ethanol and 25 g/l of hexose;

at ○ the growth curve for a prefermented medium III treated with carbon in the proportion 2 g/l;

at ▶ the growth curve for a non-fermented control medium III with 10.5% by volume of ethanol and 25 g/l of saccharose;

at Δ the growth curve for a non-fermented control medium III treated with carbon.

Thus the inhibiting substances must be for the most part of relatively low molecular weight since they are not adsorbed by the bentonite but are partially eliminated by the carbon.

An attempt was made to identify these substances in the secondary products of yeast metabolism: higher alcohols, esters and fatty acids.

The total growth is only slightly modified by the addition of higher alcohols; it is substantially reduced by the addition of esters and an ester/higher alcohol mixture. After seven days of incubation alcoholic fermentation is complete in the control media to which higher alcohols are added; 8 and 12.5 g/l of residual sugar are respectively added to the control media with esters and ester/higher alcohol mixtures added.

Above all else, the action of the three fatty acids ($C_6$, $C_8$, and $C_{10}$ acids) in the concentrations existing in wine (3 mg/l) is especially significant. These acids procure rapid and considerable mortality among the populations of "*Sacch. cerevisiae*" as illustrated by FIG. 3.

In FIG. 3, the curve ○ relates to a non-fermented control medium III (9.25% by volume of ethanol and 26.5 g/l of saccharose).

The curve ▲ relates to a control medium III to which higher alcohols are added.

The curve ■ relates to a control medium III to which esters are added.

The curve x relates to a control medium III to which esters and higher alcohols are added.

The curve * relates to a control medium III to which fatty acids are added and the curve ● relates to a prefermented medium III with 9.25% by volume of ethanol and 26.5 g/l of hexose.

As can be seen in FIG. 3, the populations of "*Sacch. cerevisiae*" in the media to which fatty acids are added (curve *) regress in four days from $8 \times 10^6$ to $4 \times 10^4$ cells per ml. The regression curve is closely comparable with those of the populations in the corresponding prefermented medium (curve *). No growth is observed for approximately 10 days. The breaking down of the sugar is virtually totally inhibited.

The inhibiting action of the fatty acids ($C_6$, $C_8$ and $C_{10}$) varies according to the alcohol concentration of the medium and the physiological state of the population. By way of example, table I below illustrates the inhibition of secondary fermentation by the presence of fatty acids in the fortified media according to the physiological state of the innoculating yeast ($10^6$ cells/ml of "*Sacch. cerevisiae*" yeast).

The above observations lead to the conclusion that the adsorption of the $C_6$, $C_8$ and $C_{10}$ fatty acids should be sufficient to facilitate the growth and fermentation of the yeast in the presence of ethanol (FIG. 2, table I).

It has been verified that treating the control medium III to which 7, 10 and 3 mg/l respectively of $C_6$, $C_8$ and $C_{10}$ acids have been added eliminates 61.4%, 97.2% and 97% respectively of these acids. On the other hand, bentonite (which is authorized) is found to be ineffective.

It has been found, in conformity with the present invention, that it is particularly beneficial to effect such adsorption using yeast cell walls (or yeast ghosts) prepared by simply boiling dry yeast ("Sacch. cerevisiae", for example) in water or after autolysis followed by washing with water.

TABLE I

| | | AFTER 15 DAYS INCUBATION AT 25° C. | | |
|---|---|---|---|---|
| MEDIUM | | Active dry yeast | Proliferating yeast | Stationary yeast |
| A | | | | |
| 11% ethanol 20 g/l | cells/ml residual | $3 \times 10^6$ | $3.4 \times 10^3$ | $1.4 \times 10^7$ |
| saccharose A' (same as A + fatty acids) | sugar (g/l) | 0.4 | 19.3 | 1.4 |
| $C_6$: 7 mg/l $C_8$: 10 mg/l | cells/ml residual | $3 \times 10^6$ | 0 | $3.6 \times 10^6$ |
| $C_{10}$: 3 mg/l | sugar (g/l) | 0.4 | 19.6 | 2.8 |
| B | | | | |
| 13% ethanol 10 g/l | cells/ml residual | $8.2 \times 10^5$ | 0 | $3.1 \times 10^2$ |
| saccharose B' (same as B + fatty acids) | sugar (g/l) | 0.4 | 9.6 | 9.2 |
| $C_6$: 7 mg/l $C_8$: 10 mg/l | cells/ml residual | $1.3 \times 10^5$ | 0 | $10^2$ |
| $C_{10}$: 3 mg/l | sugar (g/l) | 9.5 | 9.6 | 9.6 |

These cell walls fix a major part of the ethyl esters and the fatty acids, in a manner which varies according to the quantity added and the time in contact.

Table II illustrates the adsorption by the yeast cell walls of the $C_8$ and $C_{10}$ acids and the corresponding esters after three days contact in a medium containing 11% by volume of ethanol with the following initial concentrations:

$C_8$ acid: 10 mg/l
  $C_{10}$ acid: 4 mg/l
  $C_8$ acid esters: 1.5 mg/l
  $C_{10}$ acid esters: 0.8 mg/l The yeast used is "Sacch. cerevisiae".

Adsorption is extremely high for the $C_{10}$ acid esters, slightly lower for the $C_8$ acid esters and the $C_{10}$ acid and low for the $C_8$ acid.

TABLE II

ADSORPTION BY YEAST CELL WALLS OF $C_8$ AND $C_{10}$ FATTY ACIDS AND THE CORRESPONDING ESTERS AFTER THREE DAYS OF CONTACT

| | ACIDS | | | | ESTERS | | | |
|---|---|---|---|---|---|---|---|---|
| Weight of membrane | $C_8$ | | $C_{10}$ | | $C_8$ | | $C_{10}$ | |
| (yeast cell walls) | mg/l | % | mg/l | % | mg/l | % | mg/l | % |
| 1 g/l moist (100 mg by dry weight) | 9.21 | 7.8 | 2.26 | 43.36 | 0.62 | 49.59 | 0.098 | 83.42 |
| 5 g/l moist (500 mg by dry weight) | 8.81 | 11.81 | 1.65 | 58.64 | 0.58 | 52.84 | 0.070 | 88.52 |

It should be noted that grinding the yeast cell walls or spraying them after autolysis increases the adsorption surface area and the effectiveness.

The yeast cell walls provide for the fermentation of a greater quantity of sugar when they are added at the start of fermentation or during the stationary phase on the fifth day, as illustrated by tables III and IV.

Table III shows the stimulation of fermentation by the addition to a Listel must (250 g/l of sugar; $10^6$ cells/ml of "Sacch. cerevisiae" yeast; temperature 25° C.) of 1 g/l of moist cell walls 24 h after the onset of fermentation and five days after.

Note the very significant decrease in the non-fermented residual sugar in the days following addition of the cell walls as compared with the untreated control medium.

TABLE III

STIMULATION OF ALCOHOLIC FERMENTATION BY ADDITION OF YEAST CELL WALLS TO THE MUST

| | time in days | | | | | | |
|---|---|---|---|---|---|---|---|
| | 8 | 12 | 15 | 19 | 23 | 27 | 34 |
| (1) Control medium | 92.4 | 64.0 | 53.2 | 48.0 | 41.7 | 37.8 | 37.0 |
| (2) 1 g/l of moist cell walls added after 24 hours | 47.0 | 9.7 | 4.6 | 3.7 | 3.2 | 3.2 | 3.2 |
| (3) 1 g/l of moist cell walls added after 5 days | 71.0 | 26.3 | 13.9 | 6.6 | 3.6 | 2.4 | 2.4 |

Ethanol formed: (1):12.5, (2) (3):14.5

Table IV shows the stimulation of fermentation by the addition to a Listel must (200 g/l sugar; $10^6$ cells/ml of "Sacch. cerevisiae" yeast; temperature 20° C.) of 1 g/l of moist yeast cell walls at the time of seeding (for the production of white wine).

The reduction in the weight of non-fermented residual sugar relative to the control medium during the subsequent days is less sharp than at 25° C. (table III) but still significant.

At 30° C. (table V) the decrease in the weight of non-fermented residual sugar is more accentuated, however, and much more pronounced for the addition of 5 g/l of moist cell walls than for 1 g/l.

Too high a fermentation temperature ($>30°$ C.) is often the reason for fermentation ceasing; in this case the addition of cell walls is particularly effective.

TABLE IV

STIMULATION OF ALCOHOLIC FERMENTATION BY ADDITION OF YEAST CELL WALLS TO THE MUST AT DIFFERENT TEMPERATURES (white wine production)
Temperature 20° C.

| | time in days | | | | | |
|---|---|---|---|---|---|---|
| | 4 | 6 | 8 | 12 | 25 | 30 |
| Control medium | 143.5 | 113.1 | 69.6 | 34 | 3.2 | 3.2 |
| 1 g/l of moist cell added at the time of seeding | 143.5 | 100 | 61.7 | 20.9 | <2 | |

TABLE V

| Temperature 30° C. | | | | | |
|---|---|---|---|---|---|
| | time in days | | | | |
| | 4 | 6 | 8 | 12 | 14 |
| Control medium | 113.1 | 90.4 | 79.2 | 68.5 | 68 |
| 1 g/l of moist cell walls | 60.9 | 35.6 | 28 | 24.2 | 22.7 |
| 5 g/l of moist cell walls | 23 | 10 | 5 | 3.8 | 3.6 |

The addition of yeast cell walls has no effect on the organoleptic qualities of the wine.

Table VI illustrates this by showing the effect on the composition of the wine in terms of esters and fatty acids of adding yeast cell walls to a grape must (250 g/l of sugar; $10^6$ cells/ml of "*Sacch. cerevisiae*" yeast; temperature >25° C.).

The concentration differences for the $C_6$, $C_8$ and $C_{10}$ acids and their corresponding esters between a control medium and two media to which 1 g/l of moist cell walls have been added 24 h and five days respectively from the onset of fermentation are not significant and have no repercussions from the organoleptic point of view.

TABLE VI

EFFECT OF ADDING YEAST CELL WALLS TO THE MUST ON THE COMPOSITION OF THE WINE IN TERMS OF VOLATILE FATTY ACIDS AND ESTERS

| | ACID ETHYL ESTERS (mg/l) | | | | ACIDS (mg/l) | | | |
|---|---|---|---|---|---|---|---|---|
| | $C_6$ | $C_8$ | $C_{10}$ | $C_{12}$ | $C_6$ | $C_8$ | $C_{10}$ | $C_{12}$ |
| Control medium | 0.504 | 0.785 | 0.507 | 0.046 | 3.67 | 4.23 | 2.24 | 0.1 |
| +1 g/l of moist cell walls after 24 hours | 0.361 | 0.802 | 0.493 | 0.016 | 3.46 | 4.48 | 1.85 | 0.1 |
| After 5 days | 0.261 | 0.606 | 0.364 | 0.046 | 2.76 | 3.35 | 1.38 | 0.1 |

It has also been observed that adding yeast cell walls has the effect of stimulating alcoholic fermentation in sweet wine production in the case of musts contaminated with "*Botrytis cinerea*" mould.

Table VII illustrates such stimulation by the addition of moist yeast cell walls to a grape must contaminated by "*Botrytis cinerea*" (initial sugar 330 g/l; $10^6$ cells/ml of "*Sacch. cerevisiae*" yeast; temperature 22° C.).

TABLE VII

STIMULATION OF ALCOHOLIC FERMENTATION BY ADDITION OF MOIST YEAST CELL WALLS TO THE MUST

| | | time in days | | | | | | |
|---|---|---|---|---|---|---|---|---|
| | | 3 | 6 | 10 | 14 | 19 | 24 | 26 | 38 |
| Control medium (1) | | 298.2 | 264 | 231 | 208 | 181.2 | 164.5 | 161.1 | 128.3 |
| Addition before fermentation | 1 g/l (2) | 298.2 | 261.5 | 226.3 | 196.2 | 179.6 | 157.8 | 151 | 120.5 |
| | 5 g/l (3) | 284.8 | 241.4 | 194.6 | 161 | 144.4 | 114.3 | 112.6 | 83 |
| Addition after 10 days of fermentation | 1 g/l (4) | | | 230 | 194.6 | 167.4 | 134.4 | 127.7 | 97.1 |
| | 5 g/l (5) | | | 231 | 194.6 | 152.8 | 126.1 | 117.6 | 85 |

Ethanol formed: (1) 11.88 (2) 12.35 (3) 14.52 (4) 13.7 (5) 14.41

The numbers in this table express the weight of non-fermented residual sugar in g/l.

Finally, the addition of yeast cell walls facilitates the second fermentation in the case of spontaneous halting of alcoholic fermentation through excess sugar and excess temperature.

To this end, as soon as it is observed that fermentation has ceased, the wine is treated with yeast cell walls in accordance with the invention and then, one or two days after this treatment, the wine is innocculated with $10^6$ cells/ml of "*Sacch. cerevisiae*" to restart fermentation.

Table VIII illustrates the stimulation of the second fermentation after spontaneous halting of alcoholic fermentation by the addition of dry cell walls to a Listel must ($10^6$ cells/ml of "*Sacch. cerevisiae*" yeast). The fermented must is treated with 500 mg of dried cell walls; 24 hours later it is reseeded using $10^6$ cells/ml.

The numbers in table VIII express the weight of non-fermented residual sugar in g/l. The content of residual sugar in the treated media as compared with the control media is reduced, whatever the characteristics of the first fermentation.

TABLE VIII

STIMULATION OF SECONDARY FERMENTATION AFTER SPONTANEOUS HALTING OF ALCOHOLIC FERMENTATION, BY ADDITION OF DRY YEAST CELL WALLS TO THE MEDIUM

| Characteristics of first fermentation | | | Secondary fermentation time in days | | | | |
|---|---|---|---|---|---|---|---|
| | | | 9 | 12 | 16 | 27 | 30 |
| temperature: initial sugar: On spontaneous halt: | 19° C. 200 g/l | Control medium | 4.4 | 1.9 | | | |
| ethanol: residual sugar: | 11.7% vol 13.7 g/l | Medium treated with cell walls | 2 | <0.7 | | | |
| temperature: initial sugar: On spontaneous halt: | 19° C. 250 g/l | Control medium | 57.6 | 49 | 35.9 | 15.6 | 13.4 |
| ethanol: residual sugar: | 10.5% vol 67.1 g/l | Medium treated with cell walls | 53.3 | 37 | 23.6 | 2.8 | 1.4 |
| temperature: | 30° C. | Control medium | 19.4 | 8.5 | 2 | | |

TABLE VIII-continued
STIMULATION OF SECONDARY FERMENTATION AFTER SPONTANEOUS HALTING OF ALCOHOLIC FERMENTATION, BY ADDITION OF DRY YEAST CELL WALLS TO THE MEDIUM

| Characteristics of first fermentation | | | Secondary fermentation time in days | | | | |
|---|---|---|---|---|---|---|---|
| | | | 9 | 12 | 16 | 27 | 30 |
| initial sugar: | 200 g/l | | | | | | |
| On spontaneous halt: | | | | | | | |
| ethanol: | 6.4% vol | Medium treated | 2.8 | 0.5 | | | |
| residual sugar: | 91 g/l | with cell walls | | | | | |
| temperature: | 30° C. | Control medium | 66.4 | 53 | 33 | 9.9 | 8.6 |
| initial sugar: | 250 g/l | | | | | | |
| On spontaneous halt: | | | | | | | |
| ethanol: | 7% vol | Medium treated | 40.1 | 27.6 | 12.9 | 0.6 | |
| residual sugar: | 121 g/l | with cell walls | | | | | |

Generally speaking, in the prevention of arrested fermentation the yeast cell walls are preferably added at the onset of fermentation, to the clarified must in the case of white wine production and to the unclarified must in the case of red wine production. In the case of the treatment to stimulate secondary fermentation in red and white wine production, the juice is run off and the cell walls then added to it. Reseeding is effected after 24 h or 48 h.

It will be understood that the invention is not limited to the examples mentioned hereinabove but that it covers all applications of such yeast cell walls (dry or moist), however they are prepared in whatever quantities.

"Sacch. cerevisiae" yeast is used for preference as it is the majority yeast in grape musts and has a critical action in the production of the wine. Other yeasts might be used, however.

Moreover, it is possible to use dead yeast or washed yeast cell walls derived from the byproduct of the production of the yeast autolysate.

It is also important to note that the addition of said yeast ghosts also provides for the adsorbing of any exogenous substances which are toxic to the yeast, in particular pesticide residues and substances secreted by other previously developed micro-organisms. The application which has been described hereinabove to grape must contaminated with "Botrytis cinerea" illustrates this other effect of the addition of yeast ghosts. Likewise, the table IX illustrates the stimulation of fermentation in the presence of pesticide residues and substances secreted by other previously developed micro-organisms.

TABLE IX
STIMULATION OF ALCOHOLIC FERMENTATION OF GRAPE MUST INITIALLY CONTAINING INHIBITING SUBSTANCES BY THE ADDITION OF YEAST CELL WALLS BEFORE FERMENTATION
Temperature 19° C.
Yeast S. cerevisiae
RESULTS AT THE END OF FERMENTATION
Yields Expressed in Weight of Sugar Fermented

| Type of Inhibiting Substances | Characteristics of Grape Must | yeast cell walls (g/l) | | |
|---|---|---|---|---|
| | | 0 | 0.2 | 0.5 |
| Euparene[a] (4 mg/l) | Initial Sugar 250 g/l pH 3.6 | 191 | 232 | — | 247 |
| Mikal[b] (10 mg/l) | Initial Sugar 250 g/l pH 3.6 | 201 | 218 | — | 243 |
| Substances Secreted | Grape Must Parasitized by Botrytis Cinerea Initial Sugar: 320 g/l - pH 3.6 | 192 | 200 | 237 | — |

[a]"Euparene" (Bayer) dichlorofluoromethylthio-dimethyl-phenyl sulfamide
[b]"Mikal" (Rhone-Poulenc) tris-o-ethylphosphonate of aluminum + trichloromethylthio isoindolinedione Generally speaking, the yeast ghosts of any gram positive micro-organisms may be used, and in particular those of these micro-organisms which are yeasts, in particular "Sacch. cerevisiae", and lactic bacteria as illustrated by table X.

TABLE X
RESIDUAL SUGAR IN g/l
Must at 220 g/l of sugar
Innoculation $10^6$ cells/ml S. cerevisiae in dry form
Temperature 25° C.

| | 10th Day | 14th Day | 17th Day | 25th Day |
|---|---|---|---|---|
| Control | 50 | 34.9 | 30 | 25 |
| A | 45.4 | 26.6 | 19.3 | 15 |
| B | 27.7 | 16.7 | 11.9 | 9 |

A: addition of 1 g/l of bacterial cell walls in moist form
B: addition of 1 g/l of yeast cell walls in moist form The yeast ghosts are then obtained either from a single type of gram positive micro-organism or from several types, in which case they are mixed together.

It is also possible to add to these yeast ghosts living cells or any other compatible additive.

Finally, the process of the invention is applicable in a general manner to the stimulation of alcoholic fermentation of any substratum, in particular drinks such as wine, beer, saké, etc.

There is claimed:
1. In a process for the alcoholic fermentation with yeast of a substratum containing endogenous and exogenous substances toxic to yeast the presence of which substances results in the premature cessation of the fermentation process, the improvement wherein a material consisting of cell walls separated from at least one gram-positive micro-organism is added to said substratum in an amount sufficient to stimulate the fermentation process and permit said fermentation process to go to completion by adsorption of said toxic substances by said cell walls, said cell walls being produced by the boiling or autolysis of at least one gram-positive micro-organism followed by the washing of the material recovered from said boiling or autolysis step.

2. The process of claim 1 wherein at least one gram-positive micro-organism comprises yeast.

3. The process of claim 2 wherein said cell walls are prepared by boiling yeast and washing the boiled yeast cells.

4. The process of claim 2 wherein said cell walls are derived from gram-positive *Sacch. cerevisiae*.

5. The process of claim 2 further comprising admixing said yeast cell walls with living cells prior to addition to said substratum.

6. The process of claim 2 comprising adding said yeast cell walls at a ratio of about 100 to 500 mg of yeast cell walls per liter of substratum.

7. The process of claim 6 wherein said yeast cell walls are added to said substratum prior to the onset of fermentation.

8. The process of claim 6 wherein said yeast cell walls are added to said substratum about 24 hours after the onset of fermentation.

9. The process of claim 6 wherein said substratum is a previously fermented medium, and after adding said yeast cell walls innoculating said medium with a new population of yeast.

10. The process of claim 2 wherein said substratum contains *Botrytis cinerea*.

* * * * *